United States Patent
Chew et al.

(10) Patent No.: US 12,119,537 B2
(45) Date of Patent: Oct. 15, 2024

(54) RADIO ANTENNA INTERFACE

(71) Applicant: MOTOROLA SOLUTIONS, INC., Chicago, IL (US)

(72) Inventors: Jin Siang Chew, Coral Springs, FL (US); Gary A Lee, Weston, FL (US); Jody H Akens, Weston, FL (US); George Mtchedlishvili, Hallandale Beach, FL (US); Andrew P Miehl, Boca Raton, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 472 days.

(21) Appl. No.: 17/449,328

(22) Filed: Sep. 29, 2021

(65) Prior Publication Data
US 2023/0095633 A1 Mar. 30, 2023

(51) Int. Cl.
*H01Q 1/20* (2006.01)
*H01Q 1/12* (2006.01)
*H01Q 1/27* (2006.01)
*H04B 1/034* (2006.01)

(52) U.S. Cl.
CPC ............ *H01Q 1/20* (2013.01); *H01Q 1/1207* (2013.01); *H04B 1/0346* (2013.01); *H01Q 1/273* (2013.01)

(58) Field of Classification Search
CPC ........ H01Q 1/088; H01Q 1/1207; H01Q 1/20; H01Q 1/242; H01Q 1/273
See application file for complete search history.

(56) References Cited

U.S. PATENT DOCUMENTS

| | | | | | |
|---|---|---|---|---|---|
| 3,946,390 | A | * | 3/1976 | Alexander | H01Q 1/24 343/702 |
| 4,867,698 | A | * | 9/1989 | Griffiths | H01R 24/40 343/702 |
| 5,955,999 | A | * | 9/1999 | Mutz | H01Q 9/32 343/702 |

(Continued)

FOREIGN PATENT DOCUMENTS

JP 4807578 B2 11/2011

OTHER PUBLICATIONS

NFPA 1802: Standard on Two-Way, Portable RF Voice Communications Devices for Use by Emergency Services Personnel in the Hazard Zone, 2021 Released. copyright: National Fire Protection Association, Quincy, MA 2020, sections—8.14.5, 8.14.6, 8.4, 8.5.

*Primary Examiner* — Minh N Trinh
(74) *Attorney, Agent, or Firm* — Barbara R. Doutre; Miles I. Polley (57) ABSTRACT

A radio antenna interface for a portable radio is provided comprising a radio housing having a control top with a circular walled control top opening for receiving an antenna, the circular walled control top opening having an interior surface with a protruding bumper feature formed thereon. An antenna having has a base portion for insertion into the circular walled control top opening, the base portion has a ring feature forming a full circumference bump around the base portion. Once the antenna is assembled with the portable radio, the ring feature is located beneath and abuts with the protruding bumper to form the radio antenna interface. The radio antenna interface provides increased friction to minimize loosening of the antenna under extreme usage conditions.

11 Claims, 6 Drawing Sheets

(56) References Cited

U.S. PATENT DOCUMENTS

| | | | | |
|---|---|---|---|---|
| 6,262,693 B1 * | 7/2001 | Sutter | ................... | H01Q 1/242 |
| | | | | 343/702 |
| 6,597,326 B2 * | 7/2003 | Chen | ..................... | H01Q 1/242 |
| | | | | 343/702 |
| 7,337,917 B2 | 3/2008 | Kortleven et al. | | |

* cited by examiner

RADIO ANTENNA INTERFACE

BACKGROUND OF THE INVENTION

Portable communication devices, such as portable public safety radios, typically include an external antenna. Public safety radios are often subjected to harsh environmental and operating conditions, such as those presented when the device is used in fire rescue type applications. The ability to maintain RF performance under harsh conditions is important to mission critical operations. Portable radios intended for mission critical operations may be required to meet certain standards, such as National Fire Protection Association (NFPA) standards. NFPA standards may be updated from time to time. For example, a recent update to NFPA standards now require a product to go through three hours of tumble testing without degrading RF performance. It is important that the antenna remains well coupled to the portable radio device.

Accordingly, an improved radio antenna interface for a portable radio is desired.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein an improved radio antenna interface for a portable communication device. A radio housing includes a control top having a circular walled control top opening for receiving an antenna. The circular walled control top opening has an interior surface with a protruding bumper feature formed thereon. The antenna has a base portion for insertion into the circular walled control top opening, the base portion having a ring feature forming a full circumference bump around the base portion. Once assembled, the ring feature is positioned beneath and abuts with the protruding bumper to form the radio antenna interface. The radio antenna interface provides a frictional pre-load to prevent loosening of the antenna during extreme environmental and usage conditions.

A method of assembling the antenna to the portable radio is also provided. The method includes inserting a base portion of an antenna into a circular walled control top opening until a ring feature formed around the base portion of the antenna abuts with a protruding bumper feature formed within the circular walled control top opening. Then, by continued insertion of the antenna forces the ring feature to compressibly slide over the protruding bumper feature. The ring feature and protruding bumper feature then decompress thereby locating the ring feature beneath and abutting against the protruding bumper feature. The ring feature located beneath and abutting with the protruding bumper provides a frictional pre-load to prevent loosening of the antenna during extreme environmental and usage conditions.

Figure 1:
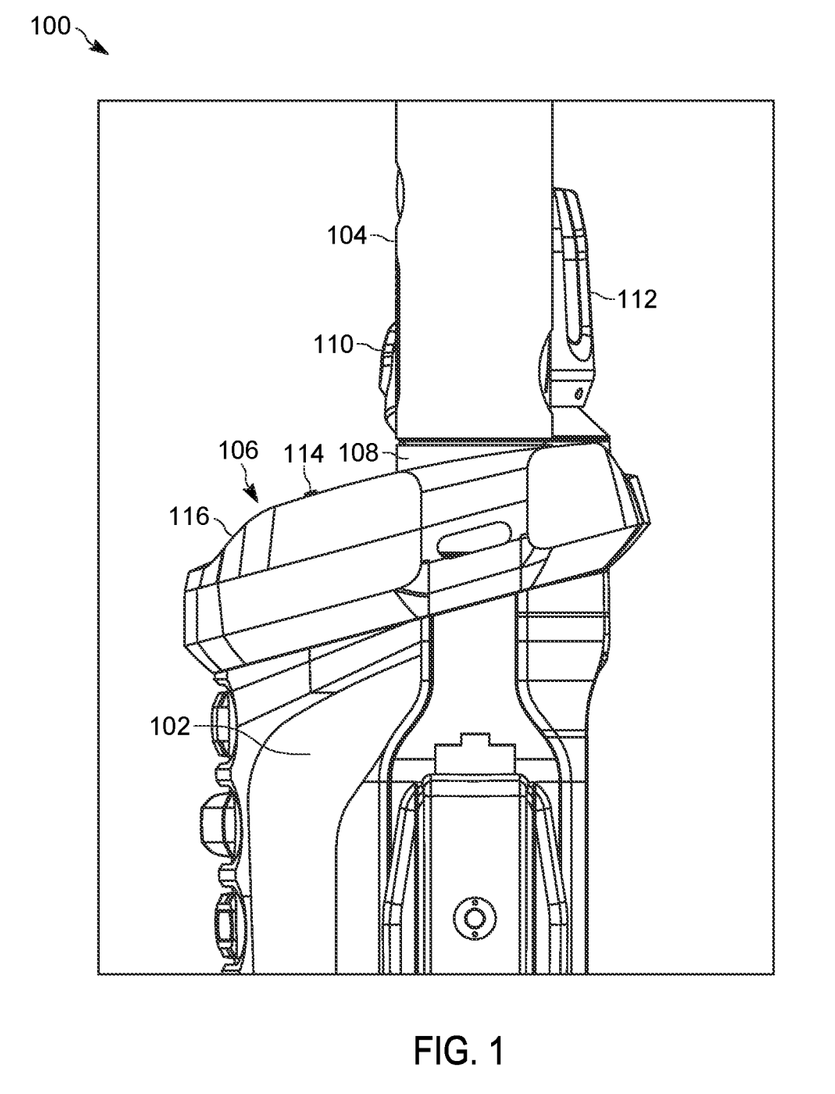
FIG. 1 is a side view of a portable radio that includes a radio antenna interface in accordance with the embodiments.

FIG. 1 is a partial side view of a portable radio 100 formed in accordance with the embodiments. The portable radio 100 includes a main housing 102 and an antenna 104 coupled to a control top 106 of the portable radio via a radio antenna interface 108 to be described herein in accordance with the embodiments. The control top 106 may further comprise user interface features such as a volume control knob 110, a channel selection knob 112, an emergency button 114, a display 116, and/or other user interface features generally associated with public safety radios. The radio housing further comprises a push-to-talk (PTT) button (not shown) for two-way radio communications. The radio antenna interface 108 advantageously facilitates maintaining RF communications under harsh operating conditions, such as those which may be encountered during fire rescue applications. Examples of such operating conditions may include drop, vibration, and tumble testing standards, as outlined by standards bodies, such as the National Fire Protection Association (NFPA). The radio antenna interface 108 will be described with reference to FIG. 2A, FIG. 2B and FIG. 3, and a method for assembling the antenna 104 to the control top 106 of the portable radio 100 via the radio antenna interface 108 will be described with reference to FIG. 4

Figure 2A:
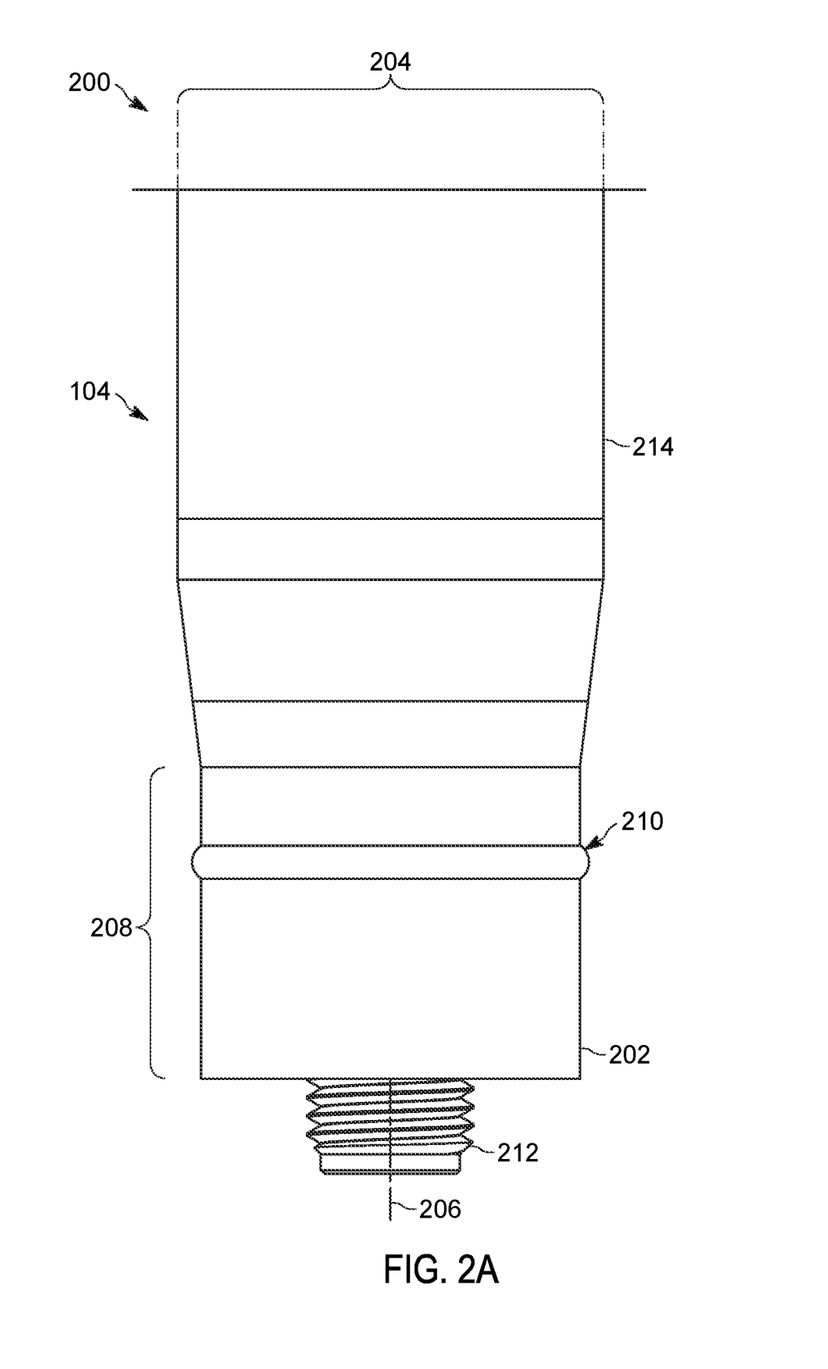
FIG. 2A is an antenna formed in accordance with the embodiments.

FIG. 2A shows a partial view 200 of the antenna 104 formed in accordance with the embodiments. The antenna has a first end 202 and second end 204 formed at opposing ends of a longitudinal axis 206, the first end providing a base portion 208 having a ring feature 210 forming a full circumference bump around the base portion. The ring feature 210 is formed of an elastomeric material integrally formed as part of an external antenna sheath 214 covering the antenna. The antenna further comprises a radio frequency (RF) connector 212, such as a threaded RF connector, extending from the base portion 208.

Figure 2B:
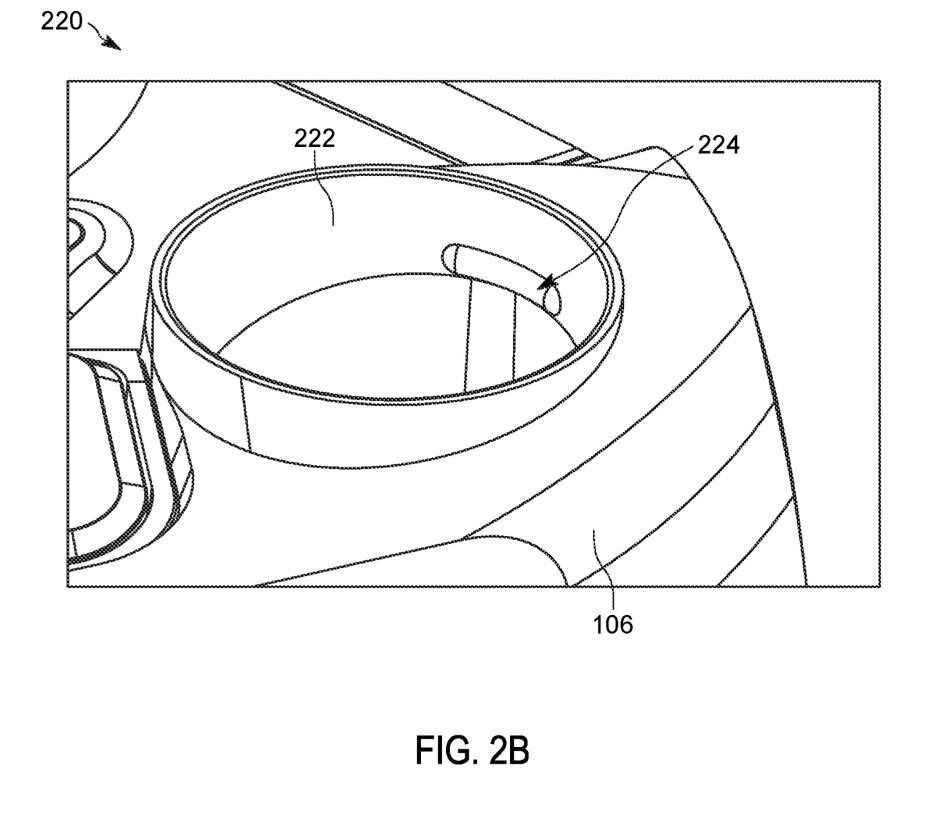
FIG. 2B is a partial perspective view of a radio control top showing an opening for receiving an antenna in accordance with the embodiments.

FIG. 2B is a partial perspective view 220 of the radio control top 106 in accordance with the embodiments. In accordance with the embodiments, the radio control top 106 comprises a circular walled control top opening 222 for receiving the antenna 104. The circular walled control top opening comprises an interior surface with a protruding bumper feature 224 formed thereon. The protruding bumper feature 224 is formed of an elastomeric material integrally formed as part of the circular walled control top opening 222. Further contained within the control top 106 and accessed through the circular walled control top opening 222 is an RF receptacle (shown in FIG. 3) for mating with the RF connector 212 of the antenna 104. Integrally forming the protruding bumper feature 224 of elastomeric material as part of circular walled control top opening 222 and integrally forming the ring feature 210 of elastomeric material as part of the antenna 104 beneficially enables compression of the ring feature 210 and protruding bumper feature 224 during insertion of the antenna into the control top and decompression of those features once the antenna is fully seated. The protruding bumper feature 224 and the ring feature 210 of a fully seated antenna provide a contact interface which maintains a pre-load to resist axial advancement and axial rotation thereby preventing loosening of a fully seated antenna.

Figure 3:
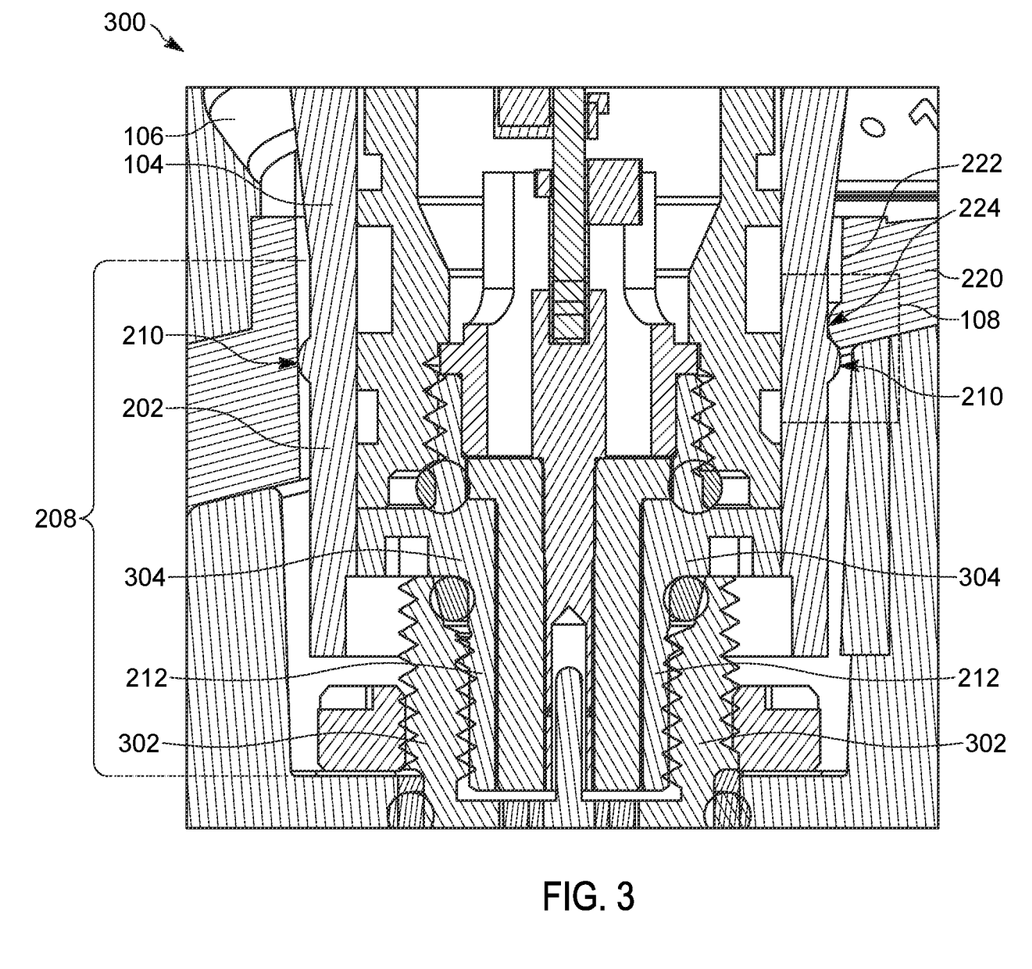
FIG. 3 is a partial cross-sectional view illustrating the radio antenna interface in accordance with the embodiments.

FIG. 3 is a partial cross-sectional view 300 illustrating the radio antenna interface 108 in accordance with the embodiments. In this view the antenna 104 is fully seated within the control top 106 of the radio housing of FIG. 1. In accordance with the embodiments, the radio antenna interface 108 for the portable radio comprises control top 106 having a circular walled control top opening 222 for receiving the antenna 104. The circular walled control top opening 222 has an interior surface with the protruding bumper feature 224 formed thereon. The first end 202 of the antenna 104 provides a base portion 208 inserted into the circular walled control top opening 222, the base portion having a ring feature 210 forming a full circumference bump around the base portion. The ring feature 210 is located beneath and abuts with the protruding bumper feature 224 to form the radio antenna interface 108.

The antenna 104, as shown previously, includes RF connector 212, and the control top 106 includes an RF receptacle 302. RF coaxial connectors, such as Sub-Miniature Version A (SMA) type RF connectors are favored for their screw coupling mechanism. The threaded RF connector 212 of the antenna is screwed into the corresponding threaded RF receptacle of the circular walled control top opening 222. While SMA connectors are favored for their screw coupling mechanism which is reliable and vibration resistant, the harsh operational environments presented in public safety applications, such as drop, vibrate, and tumble may still cause loosening of the antenna. Past antennas which relied on friction between o-rings on the antenna SMA connectors along with an RF bushing of the control top have not provided sufficient backout force to meet current testing requirements, such as those of the NFPA standards.

In accordance with the embodiments, the antenna 104 is coupled to the control top 106 of portable radio by screwing the RF connector 212 of the antenna 104 into the RF receptacle 302 of the control top 106 until the ring feature 210 abuts with the protruding bumper feature 224. Continued screwing of the RF connector 212 of the antenna into the RF receptacle 302 of the radio pushes the ring feature 210 over the protruding bumper feature 224 to locate the ring feature beneath and abutting with the protruding bumper. The ring feature 210 and the protruding bumper feature 224, being formed of elastomeric material as part of the antenna 104 and circular walled control top opening 222 respectively, compress in response to die ring feature being pushed over the protruding bumper and decompress in response to the ring feature being located beneath and abutting with the protruding bumper thereby providing both rotational and axial friction. The threaded RF receptacle 302 within the circular walled control top opening provides a hard stop to a flange 304 of the corresponding threaded RF connector 212 of the antenna 104.

The radio antenna interface 108 advantageously maintains a constant pre-load that prevents antenna axial advancement and antenna axial rotation thereby preventing loosening of the antenna from the control top of the portable radio. The constant pre-load of the radio antenna interface is maintained under operating conditions of the portable radio associated with public safety applications such as drop, vibration, and tumble conditions. The radio antenna interface 108 is integrally formed as part of the antenna 104 and as part of the control top 106 without use of snap lock, o-ring, or spring plunger piece parts.

Figure 4:
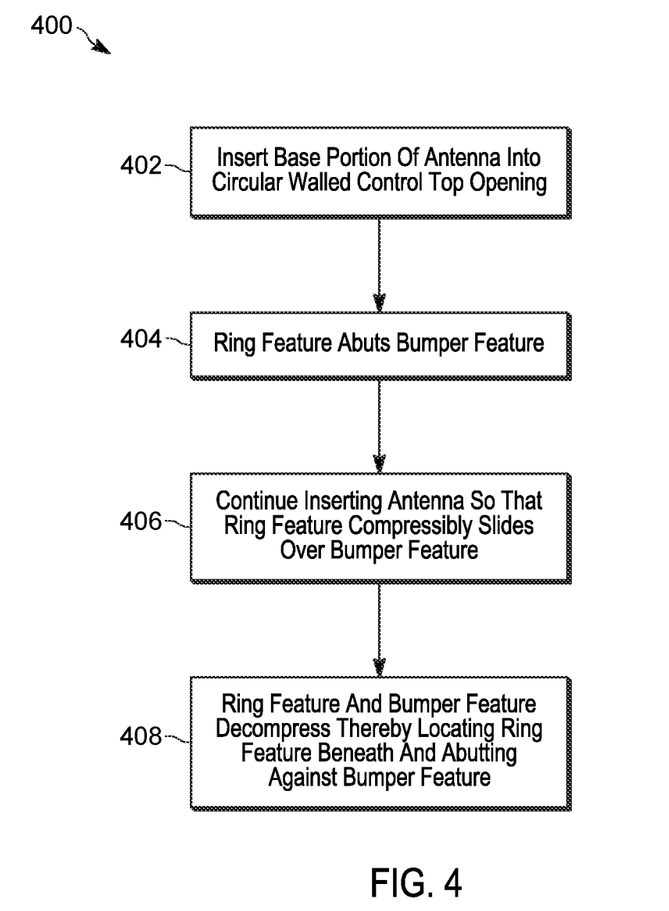
FIG. 4 is a flowchart for method of assembling an antenna to a portable radio in accordance with the radio antenna interface of the embodiments.

FIG. 4 is a flowchart for method 400 of assembling an antenna to a portable radio in accordance with the radio antenna interface of the embodiments. Referring to FIGS. 1-4, the method 400 begins at 402 by inserting base portion 208 of antenna 104 into the circular walled control top opening 222 of the portable radio 100 until, at 404, the ring feature 210, formed around the base portion of the antenna, abuts with the protruding bumper feature 224, formed within the circular walled control top opening 222 of the control top 106. At 406, continued insertion of the antenna compressibly slides the ring feature 210 over the protruding bumper feature 224. At 408, the ring feature 210 and protruding bumper feature 224 decompress thereby locating the ring feature 210 beneath and abutting against the protruding bumper feature 224. The ring feature being located beneath and abutting with the protruding bumper forms a frictional contact interface between the radio control top and the antenna.

The steps of insertion may be performed by screwing a threaded RF connector, such as RF connector 212 of the antenna 104, into a corresponding threaded RF receptacle 302 of the control top 106 until the ring feature abuts with the protruding bumper feature. Continued screwing of the antenna 104 into the corresponding threaded RF receptacle 302 pushes the ring feature 210 over the protruding bumper feature. The threaded RF connector 212 of the antenna is includes flange 304 that abuts with the threaded RF receptacle to fully seat the antenna within the circular walled control top opening.

The protruding bumper feature 224 and the protruding ring feature 210 are formed elastomeric material integrally molded as part of their respective circular walled control top opening 222 and antenna 104 which allows for compressing and decompressing of these features while being positioned. The protruding bumper feature 224 and the ring feature 210 of the fully seated antenna maintain a pre-load to resist axial advancement and axial rotation thereby preventing loosening of the fully seated antenna.

Figure 5A:
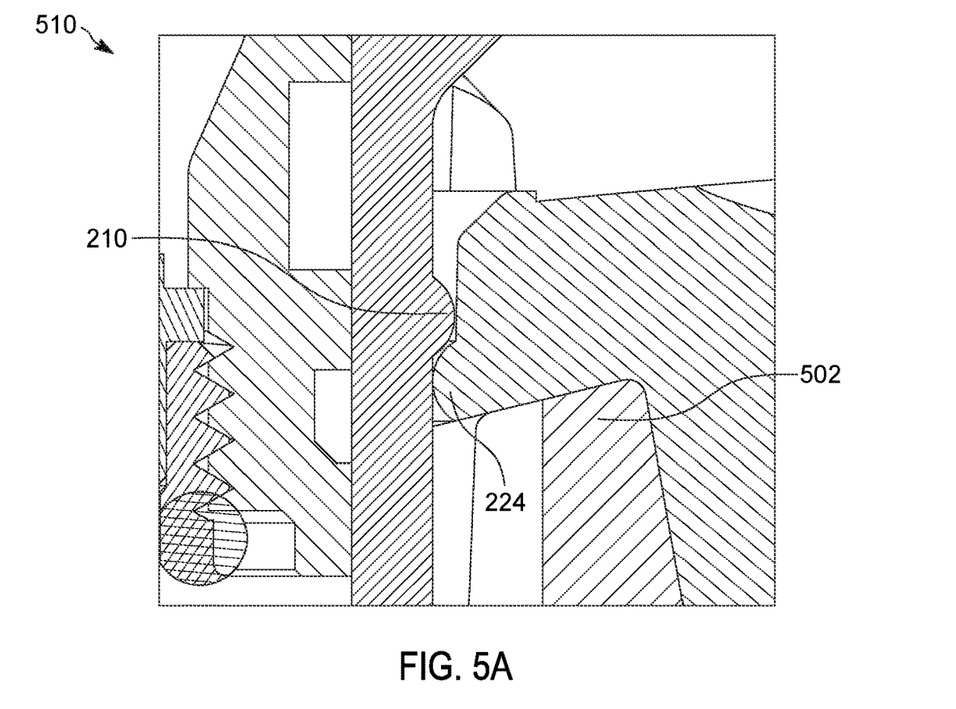
FIG. 5A is an enlarged view of the radio antenna interface in a first insertion position in accordance with the embodiments.
Figure 5B:
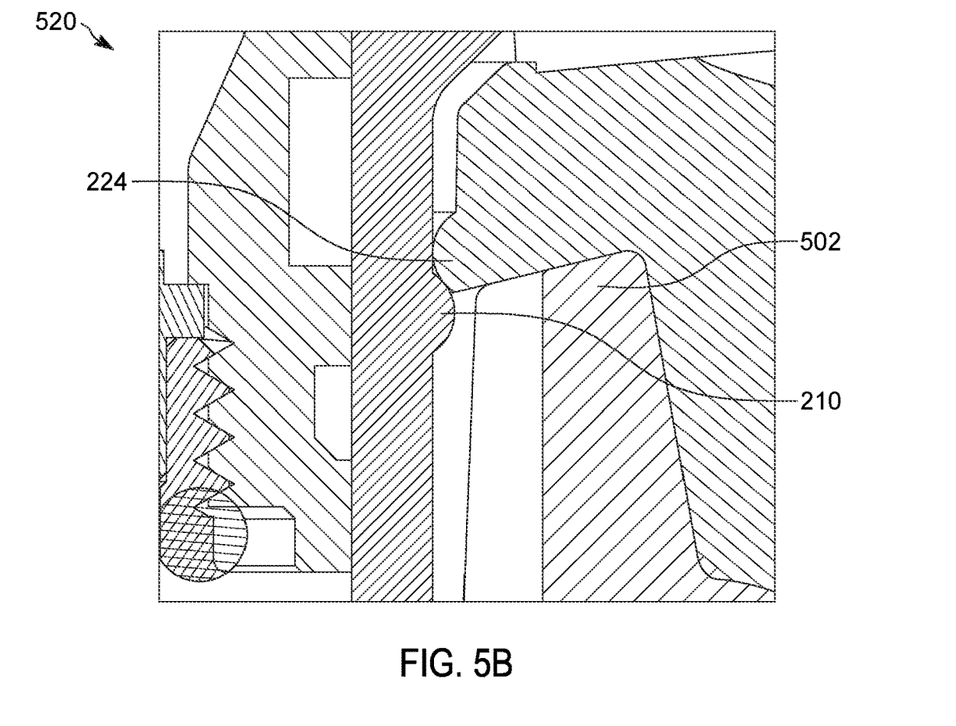
FIG. 5B is an enlarged view of the radio antenna interface in a second insertion position in accordance with the embodiments.

FIG. 5A is an enlarged view of the radio antenna interface in a first insertion position in accordance with some embodiments. In this view 510, the ring feature 210 abuts with the top of protruding bumper feature 224. FIG. 5B is an enlarged view of the radio antenna interface 1 in a second insertion position in accordance with some embodiments. In this view 520, the ring feature 210 is located beneath and abutting with the protruding bumper 224. This second, fully seated, position, is achieved by continued screwing of the RF connector of the antenna into the RF receptacle of the radio which, as described previously, pushes the ring feature 210 over the protruding bumper feature 224 to locate the ring feature beneath and abutting with the protruding bumper.

Although not required, in some embodiments, a cast aluminum carrier 502 may be incorporated into the circular walled control top opening 222. The elastomeric bumper 224 and a top portion of the aluminum carrier 502 may be bonded, thus providing additional support to the protruding bumper feature 224.

Accordingly, an improved radio antenna interface 108 has been provided by the various embodiments. The use of piece parts has been minimized as the radio antenna interface is integrally formed without use of snap lock, o-ring, or spring plunger piece parts. The radio antenna interface formed of the ring feature 210 located beneath and abutting with the protruding bumper feature 224 provides a frictional contact interface between the circular walled control top opening 222 and the antenna 104 which prevents loosening of the antenna under hash operating conditions, such as drop, vibrate, and tumble. By preventing the antenna 104 from loosening, RF communications can be advantageously maintained.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An antenna interface connector system for a portable radio, comprising:
    a radio housing comprising a control top having a circular walled control top opening for receiving an antenna, the circular walled control top opening having an interior surface with a protruding bumper feature formed thereon;
    an antenna having a first end and second end formed at opposing ends of a longitudinal axis, the first end providing a base portion inserted into the circular walled control top opening, the base portion having a ring feature, the ring feature forming a full circumference bump around the base portion; and
    the ring feature being located beneath and abutting with the protruding bumper to form the radio antenna interface.

2. The antenna interface connector system of claim 1, wherein the radio antenna interface maintains a constant pre-load that prevents antenna axial advancement and antenna axial rotation thereby preventing loosening of the antenna from the control top of the portable radio.

3. The antenna interface connector system of claim 2, wherein the constant pre-load of the radio antenna interface is maintained under operating conditions of the portable radio comprising drop, vibration, and tumble conditions.

4. The antenna interface connector system of claim 1, wherein the antenna comprises an external antenna sheath and the ring feature is formed of an elastomeric material integrally formed as part of the antenna sheath, and the protruding bumper is integrally formed as part of the circular walled control top opening.

5. The antenna interface connector system of claim 1, wherein the antenna is coupled to the radio by:
    screwing a radio frequency (RF) connector of the antenna into an RF receptacle of the portable radio until the ring feature abuts with the protruding bumper feature; and
    continue screwing the RF connector of the antenna into the RF receptacle of the radio thereby pushing the ring feature over the protruding bumper feature to locate the ring feature beneath and abutting with the protruding bumper.

6. The antenna interface connector system of claim 5, wherein the ring feature and the protruding bumper feature compress in response to the ring feature being pushed over the protruding bumper and decompress in response to the ring feature being located beneath and abutting with the protruding bumper thereby providing both rotational and axial friction.

7. The antenna interface connector system of claim 1, wherein the radio antenna interface is integrally formed without use of snap lock, o-ring, or spring plunger piece parts.

8. The antenna interface connector system of claim 1, further comprising:
- a threaded radio frequency (RF) connector protruding from the antenna for screwing into a corresponding threaded RF receptacle within the circular walled control top opening, the threaded RF receptacle within the circular walled control top opening providing a hard stop to a flange of the threaded RF connector of the antenna.

9. The antenna interface connector system of claim 8, wherein:
- the threaded RF connector of the antenna is screwed into the corresponding threaded RF receptacle of the circular walled control top opening until the ring feature of the antenna abuts with the protruding bumper feature of the circular walled control top opening; and
- the ring feature compressibly slides over the protruding bumper feature, in response to an external push force, thereby locating the ring feature beneath and abutting with the protruding bumper to form a frictional interface.

10. The antenna interface connector system of claim 9, wherein the protruding bumper of the circular walled control top opening and the ring feature of the antenna are formed of elastomeric material.

11. The antenna interface connector system of claim 1, further comprising:
- a cast aluminum carrier incorporated into the circular walled control top opening, the protruding bumper feature being bonded to a top portion of the cast aluminum carrier.

* * * * *